US007342799B2

(12) United States Patent
Mutoh (10) Patent No.: US 7,342,799 B2
(45) Date of Patent: Mar. 11, 2008

(54) SYSTEM USING POWER CONVERTER, MICROSURGE SUPPRESSOR AND MICROSURGE SUPPRESSION METHOD

(75) Inventor: Nobuyoshi Mutoh, Tokyo (JP)

(73) Assignee: Keio University, Tokyo (JP)

( * ) Notice: Subject to any disclaimer, the term of this patent is extended or adjusted under 35 U.S.C. 154(b) by 620 days.

(21) Appl. No.: 10/922,167

(22) Filed: Aug. 20, 2004

(65) Prior Publication Data
US 2005/0078426 A1  Apr. 14, 2005

(30) Foreign Application Priority Data
Aug. 22, 2003  (JP)  ............ P.2003-298822

(51) Int. Cl.
*H05K 5/00* (2006.01)
(52) U.S. Cl. ............ 361/752; 361/790; 361/729; 361/760; 361/761
(58) Field of Classification Search ............ 361/715, 361/752, 790, 797, 760–761, 729, 766; 174/256, 174/262, 350, 257
See application file for complete search history.

(56) References Cited

U.S. PATENT DOCUMENTS

| 5,321,573 A * | 6/1994 | Person et al. ............ 361/56 |
| 6,678,138 B2 * | 1/2004 | Glaser et al. ............ 361/103 |
| 2007/0167085 A1 * | 7/2007 | Lopez et al. ............ 439/709 |

FOREIGN PATENT DOCUMENTS

JP  2002-58162 A  2/2002

OTHER PUBLICATIONS

Alessandro F. Moreira, "High-Frequency Modeling for Cable and Induction Motor Overvoltage Studies in Long Cable Drives", IEEE, vol. 38, No. 5, Sep./Oct. 2002.
Noboru Aoki, et al., Damping Circuit ot Suppress Motor Terminal Overvoltage and Ringing in PWM Inverter-FED AC Motor Drive Systems With Long Motor Leads, IEEE, vol. 35, No. 5, Sep./Oct. 1999.
Hiroshi Hasegawa, et al., "A Three-Phase Voltage-Source PWM Inverter System Characterized by Sinusoidal Output Voltage With Neither Common-Mode Voltage nor Normal-Mode Voltage -Design and Performance of a Passive EMI Filter-", 2002.

* cited by examiner

*Primary Examiner*—Tuan T. Dinh
*Assistant Examiner*—Hung S Bui
(74) *Attorney, Agent, or Firm*—Sughrue Mion, PLLC (57) ABSTRACT

A motor driving system includes an AC power supply 1, an AC reactor 2, a power converter 3 and a motor 4. A microsurge suppressor 5 is inserted on a power supply line from the power converter 3 to the motor 4 and the similar microsurge suppressor 6 is inserted on a power supply line from the AC reactor 2 to the power converter 3. The microsurge suppressor 5 includes a multi-layer printed wiring board having two terminals connected to the power converter 3 and the motor 4 and a capacitor for bypassing a surge, and the terminal 4 on the side of the motor of the multi-layer printed wiring board is directly connected to a terminal of the motor 4. The capacitor for bypassing a surge is connected between the terminal of the motor 4 and the end on the side of a second terminal of second wiring.

17 Claims, 13 Drawing Sheets

SYSTEM USING POWER CONVERTER, MICROSURGE SUPPRESSOR AND MICROSURGE SUPPRESSION METHOD

BACKGROUND OF THE INVENTION

The present invention relates to a system using a power converter controlled by switching, for example, a system that drives various loads such as a motor by the output of a power converter.

A power converter controlled by switching is used for driving various equipment such as a motor and is also utilized in fields of household electrical appliances, transportation equipment, an uninterruptible power system, a solar generator and a fuel cell. To realize required performance, the improvement of the switching characteristics of power elements forming the power converter is required to be promoted, switching speed for pulse width control is 10 to 100 ns and is considerably fast.

When pulse voltage having an abrupt waveform and generated because of high speed PWM (Pulse Width Modulation) control is applied to equipment connected to the power converter, for example, an AC reactor connected to the side of a converter (the side of an alternating-current power supply) and a load (a motor and others) connected to the side of an inverter, the pulse voltage is reflected at each terminal of the AC reactor and the load and an oscillatory microsurge is caused. The terminal voltage of the AC reactor and the load rises because of the constant of wiring between the power converter and the AC reactor or the load.

When the microsurge is caused, the insulation of equipment forming a system is deteriorated, and the reliability and the life are deteriorated. Besides, in case common mode current via the stray capacitor of the equipment is caused because of surge voltage and a load is a motor, shaft current that flows on the side of the shaft of the motor is caused. The generation of the shaft current particularly comes into question in case an applied object is an electric railcar, an iron and steel plant and others. Further, as strong radiation noise is caused in the vicinity of the power supply terminal of the load, electromagnetic interference is caused in near electronic equipment and a near information communication device. Particularly, as most objects that utilize a recent power converter use information equipment, the effect is serious. Besides, the effect upon wireless LAN being popularized and networked home by wireless to be expected in future is also serious.

Figure 11:
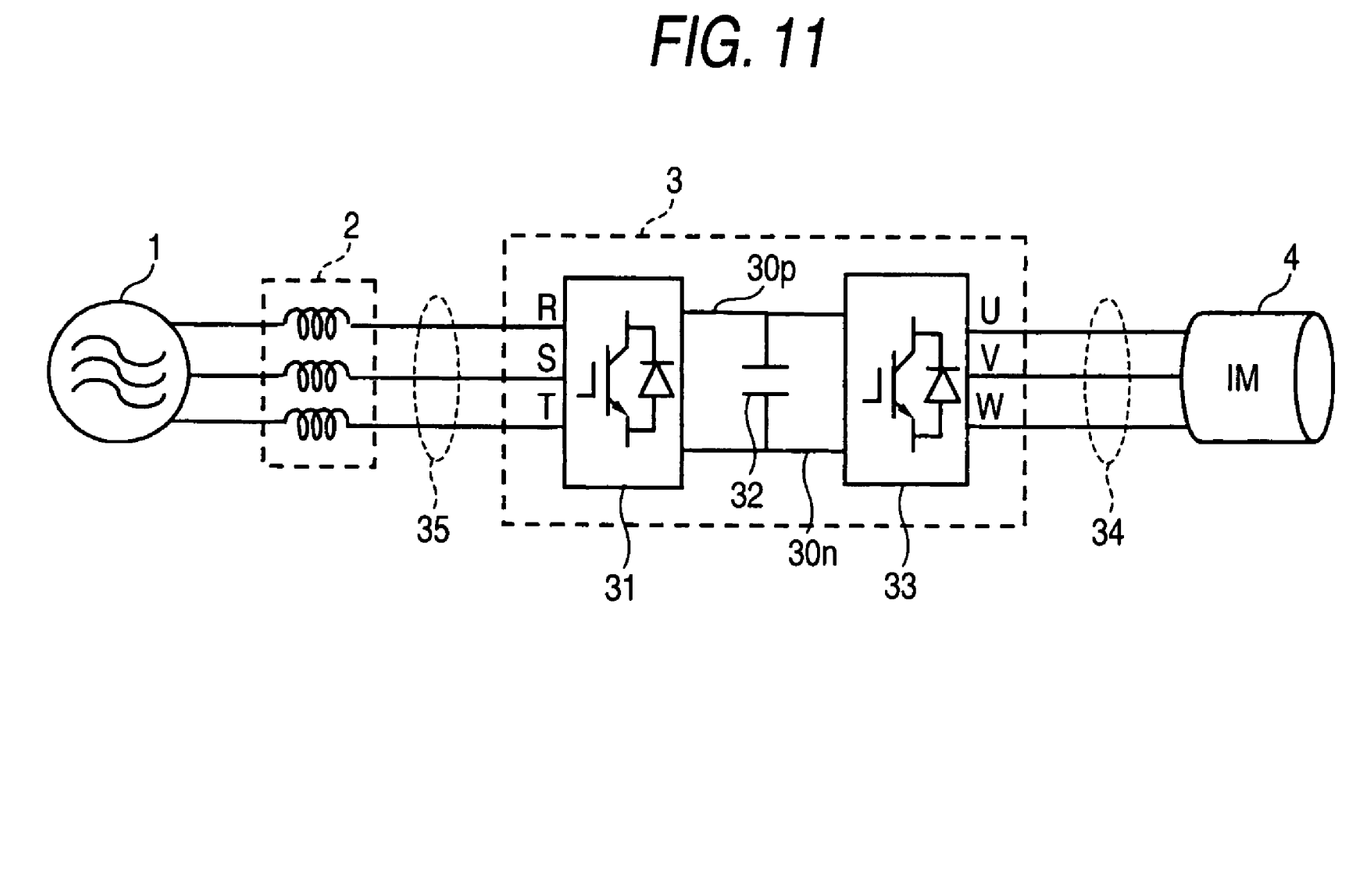
FIG. 11 shows the schematic configuration of a motor driving system.

FIG. 11 shows the schematic configuration of a motor driving system which is one example of a system using a power converter controlled by switching. The motor driving system shown in FIG. 11 includes an AC power supply 1, an AC reactor 2, a power converter 3 and a motor 4. The AC reactor 2, a frame (not shown) of the motor 4 and the earth line (not shown) of the power converter 3 are grounded. The frame denotes structure which supports equipment and which covers the whole equipment with a conductor in a state in which the structure is electrically insulated from a current-carrying part of the equipment.

The power converter 3 receives power supplied from the AC power supply 1 via the AC reactor 2 and converts it to power of an arbitrary frequency and arbitrary voltage. The power converter 3 basically includes a converter (a power rectifier) 31 that converts input ac power to dc voltage, a smoothing capacitor 32 that smoothes dc voltage output from the converter 31 and an inverter (a power inverter) 33 that converts the smoothed dc voltage to ac voltage, these components are mounted on a wiring board (not shown), and the converter 31 and the inverter 33 are connected via dc main circuit conductors 30n, 30p formed on the wiring board. A cooling fin (not shown) is attached to each element case including the converter 31 and the inverter 33. The cooling fin is provided to suppress the temperature rise of the elements and is electrically connected to an earth line (not shown) of the wiring board.

In such a system, pulse voltage having an abrupt waveform and generated at the terminal of the inverter 33 because of high speed PWM (Pulse Width Modulation) control is propagated to the terminal of the motor 4 via a cable 34 and is reflected at the terminal of the motor 4 because the impedance is unconformable. Therefore, at the terminal of the motor 4, a microsurge is caused. Similarly, pulse voltage having an abrupt waveform and generated at the terminal of the converter 31 is propagated to the terminal of the AC reactor 2 via a cable 35, is reflected at the terminal of the AC reactor 2 because the impedance is mismatched, and a microsurge is also caused at the terminal of the AC reactor.

Figure 12A:
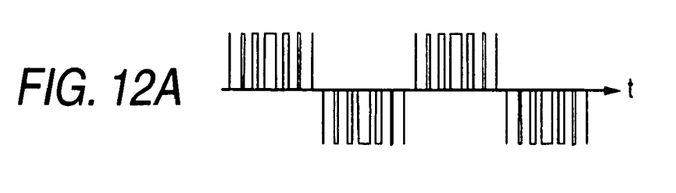
FIGS. 12A to 12E show voltage waveforms at the terminal of an inverter and at the terminal of a motor in a conventional type system.
Figure 12B:
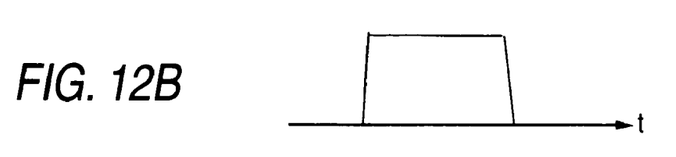
Figure 12C:
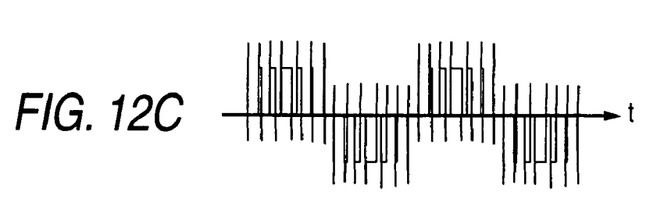
Figure 12D:
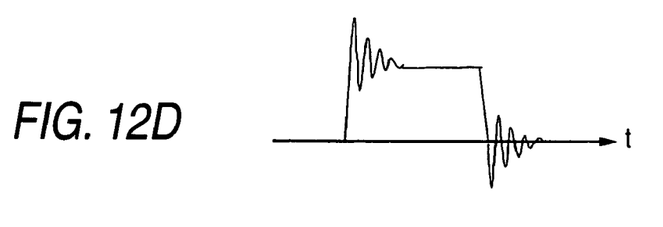
Figure 12E:
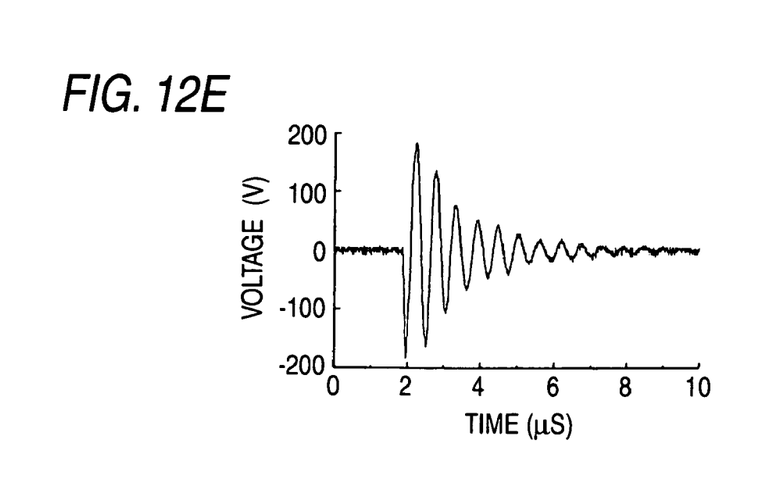

FIGS. 12A to 12E show voltage waveforms at the terminals of the inverter 33 and the motor 4. FIG. 12A shows a voltage waveform at the terminal of the inverter 33 and FIG. 12B shows an enlarged waveform of a part. FIG. 12C shows a voltage waveform at the terminal of the motor 4 and FIG. 12D shows an enlarged waveform of a part. FIG. 12E shows a measured example of the voltage waveform at the terminal of the motor 4. As shown in FIGS. 12A to 12E, a microsurge is remarkable on the side of the terminal of the motor 4, and it is known that the surge becomes large as the cable 34 is extended.

Figure 13A:
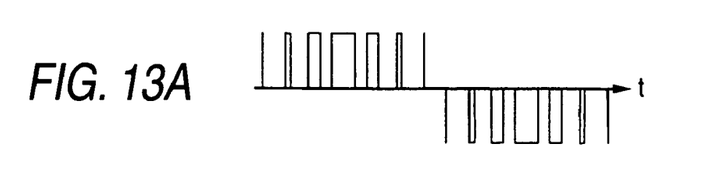
FIGS. 13A to 13E show voltage waveforms at the terminal of a converter and at the terminal of an AC reactor in the conventional type system.
Figure 13B:
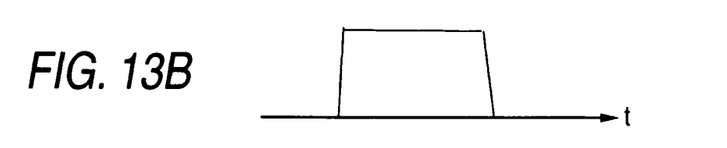
Figure 13C:
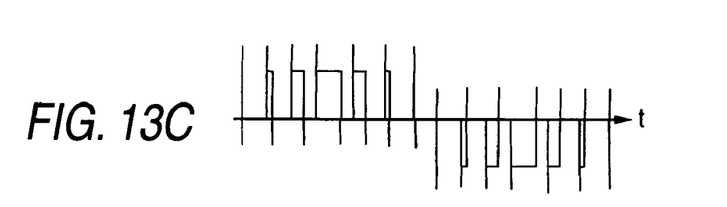
Figure 13D:
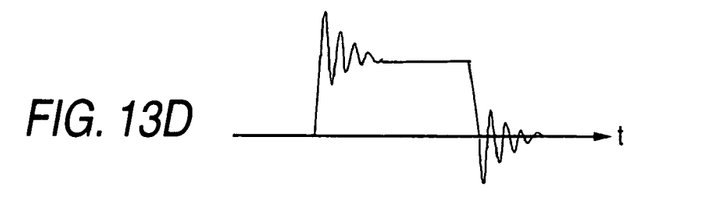
Figure 13E:
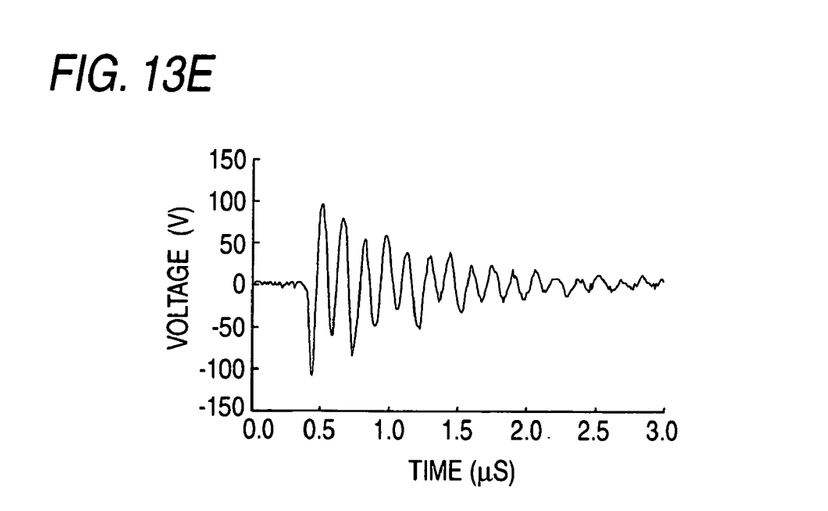

FIGS. 13A to 13E show voltage waveforms at the terminals of the converter 31 and the AC reactor 2. As in FIGS. 12A to 12E, FIG. 13A shows a voltage waveform at the terminal of the converter 31 and FIG. 13B shows an enlarged waveform of a part. FIG. 13C shows a voltage waveform at the terminal of the AC reactor 2 and FIG. 13D shows an enlarged waveform of a part. FIG. 13E shows a measured example of the voltage waveform at the terminal of the AC reactor 2. As shown in FIGS. 13A to 13E, a microsurge is also remarkable on the side of the terminal of the AC reactor 2.

For a measure against the deterioration of the reliability and the life by the microsurge, there is a method of increasing the withstand voltage of the motor. For a method of suppressing a microsurge, there are a method of using a microsurge suppression filter (refer to a patent document 1), a method of equalizing the impedance of the motor and the cable (refer to a non-patent document 1), a method of inserting a damping circuit at the terminal of the motor (refer to a non-patent document 2) and a method of inserting a high-tension circuit into a control system of the power converter and delaying a leading edge of voltage (refer to a non-patent document 3).

However, as the proper performance of the power converter may be deteriorated by the addition of these means for the measures, countermeasures in which wavelike effect upon the whole system including the power converter is fully examined are required. Besides, as countermeasures in which the characteristics of the cables and the input impedance and others of the motor and others are fully grasped are required, measurement requiring labor and intricate computing are required and improvement is required in terms of flexibility.

Further, when anew component is added for a measure against a microsurge, the induction of common mode current from the component and the generation of radiation noise cannot be avoided. Besides, when the capacity of the power converter is increased, the large-sizing of the component for a countermeasure which is made of iron and which includes winding structure and the increase of the weight cannot be avoided and the cost is increased.

[Patent Document 1]
JP-A-2002-58162

[Non-Patent Document 1]
A. F. Moreira, T. A. Lipo, G. Venkataramanan, and S. Bernet, "High-Frequency Modeling for Cable and Induction Motor Overvoltage Studies in Long Cable Drives", IEEE Trans. Ind. Applicat., vol. 38, pp. 1297-1306, September/October 2002.

[Non-Patent Document 2]
N. Aoki, K. Satoh, and A. Nabae, "Damping Circuit to Suppress Motor Terminal overvoltage and Ringing in PWM Inverter-Fed AC Motor Drive Systems with Long Motor Leads", IEEE Trans. Ind. Applicat., vol. 35, pp. 1014-1020, September/October 1999.

[Non-Patent Document 3]
Hasegawa, Domoto, and Akagi, "Design and Characteristics of Three-phase Sinewave Voltage Output PWM Inverter System Passive EMI Filter That Generates No Common Mode Voltage", Electrical Theory D, vol. 122, No. 8, pp. 845-852, 2002.

SUMMARY OF THE INVENTION

The invention is made in view of the above-mentioned situation and the object is to suppress a surge generated at the terminal of equipment connected to a power converter without depending upon a condition of a component such as the length of a cable and the capacity of the power converter and to simultaneously suppress radiation noise and current (shaft current) that flows on its shaft in case a load is a motor.

A system according to the invention uses the power converter controlled by switching, is provided with a microsurge suppressor on the side of the load inserted on a power supply line from the power converter to the load, the microsurge suppressor on the side of the load includes a multi-layer printed wiring board on the side of the load provided with a first terminal on the side of the power converter and a second terminal on the side of the load and a capacitative element for bypassing a surge on the side of the load, a first power wiring and a second power wiring respectively capacitively coupled are formed on a first wiring layer and a second wiring layer of the multi-layer printed wiring board on the side of the load, the first terminal and the second terminal are connected via the first power wiring, the second terminal and a terminal of the load are directly connected, and the capacitative element for bypassing a surge on the side of the load is directly connected to the second terminal and the end on the side of the second terminal of the second power wiring.

According to the invention, an oscillatory component propagated to the terminal of the load can be made to flow to the second power wiring 52 by capacitive coupling via the capacitor for bypassing a surge and a microsurge can be effectively suppressed. Besides, radiation noise can be reduced by suppressing a microsurge at the terminal of the load.

The system according to the invention includes the capacitative element for bypassing a surge on the side of the load having larger capacity than capacitance between the terminals of the load. According to the invention, highfrequency current from the terminal of the load to the load can be securely bypassed and shaft current in case the load is a motor can be suppressed.

The system according to the invention includes the first power wiring and the second power wiring respectively geometrically symmetrical. According to the invention, reflected current can be reversed and electromagnetic noise by first reflection at the terminal of the load can be effectively suppressed.

The system according to the invention includes a damping resistor connected to the end on the side of the first terminal of the second power wiring. According to the invention, a reflected wave induced onto the second power wiring can be effectively suppressed.

The system according to the invention includes the multi-layer printed wiring board including a third power wiring to be a virtual grounding conductor formed on a third layer and a damping resistor connected between the end on the side of the first terminal of the second power wiring and the third power wiring. According to the invention, an unbalanced component of each phase output from an inverter can be absorbed, the variation of potential is suppressed and a leak can be effectively prevented.

The system according to the invention is further provided with a microsurge suppressor on the input side inserted on a power supply line from the AC reactor on the side of an AC power supply to the power converter, the microsurge suppressor on the input side includes a multi-layer printed wiring board on the input side provided with a third terminal and a fourth terminal and a capacitative element for bypassing a surge on the input side, a fourth power wiring and a fifth power wiring respectively capacitively coupled are formed on a first wiring layer and a second wiring layer of the multi-layer printed wiring board on the input side, the third terminal and the fourth terminal are connected via the fourth power wiring, the fourth terminal and a terminal of the AC reactor are directly connected, and the capacitative element for bypassing a surge on the input side is directly connected to the fourth terminal and the end on the side of the fourth terminal of the fifth power wiring.

The system according to the invention includes the capacitative element for bypassing a surge on the input side having larger capacity than capacitance between the terminals of the AC reactor.

The system according to the invention includes the fourth power wiring and the fifth power wiring respectively geometrically symmetrical.

The system according to the invention includes a damping resistor connected to the end on the side of the third terminal of the fifth power wiring.

The system according to the invention includes the multi-layer printed wiring board including a sixth power wiring to be a virtual grounding conductor formed on a third layer and provided with a damping resistor connected between the end on the side of the third terminal of the fifth power wiring and the sixth power wiring.

A microsurge suppressor according to the invention is provided to suppress the generation of a microsurge in the system using the power converter controlled by switching, is provided with a multi-layer printed wiring board having a first terminal on the side of the power converter and a second terminal on the side of another equipment and a capacitative element for bypassing a surge, a first power wiring and a second power wiring respectively capacitively coupled are formed on a first wiring layer and a second wiring layer of the multi-layer printed wiring board, the first terminal and the second terminal are connected via the first power wiring, the second terminal and a terminal of the other equipment are directly connected, and the capacitative element for bypassing a surge is directly connected to the second terminal and the end on the side of the second terminal of the second power wiring.

The microsurge suppressor according to the invention includes the capacitative element for bypassing a surge having larger capacity than capacitance between the terminals of another equipment.

The microsurge suppressor according to the invention includes the first power wiring and the second power wiring respectively geometrically symmetrical.

The microsurge suppressor according to the invention is provided with a damping resistor connected to the end on the side of the first terminal of the second power wiring.

The microsurge suppressor according to the invention includes the multi-layer printed wiring board including a third power wiring to be a virtual grounding conductor formed on a third layer and a damping resistor connected between the end on the side of the first terminal of the second power wiring and the third power wiring.

The microsurge suppressor according to the invention includes the other equipment as a load driven by the power converter.

The microsurge suppressor according to the invention includes the other equipment as an AC reactor connected to the side of an AC power supply for supplying to the power converter.

A microsurge suppression method according to the invention is a way to generate a microsurge at an intermediate terminal except a terminal of an equipment between the power converter and the equipment connected to the power converter and to control the generated microsurge between the intermediate terminal and the terminal of the equipment in the system using the power converter controlled by switching.

According to the invention, a surge generated at the terminal of the equipment (the load connected to the output side such as the motor, the AC reactor connected to the input side) connected to the power converter is suppressed without depending upon a condition such as the length of the cable and the capacity of the power converter and simultaneously, radiation noise and current (shaft current) that flows, on its shaft in case the load is the motor) can be suppressed.

DETAILED DESCRIPTION OF THE PREFERRED EMBODIMENTS

Figure 1:
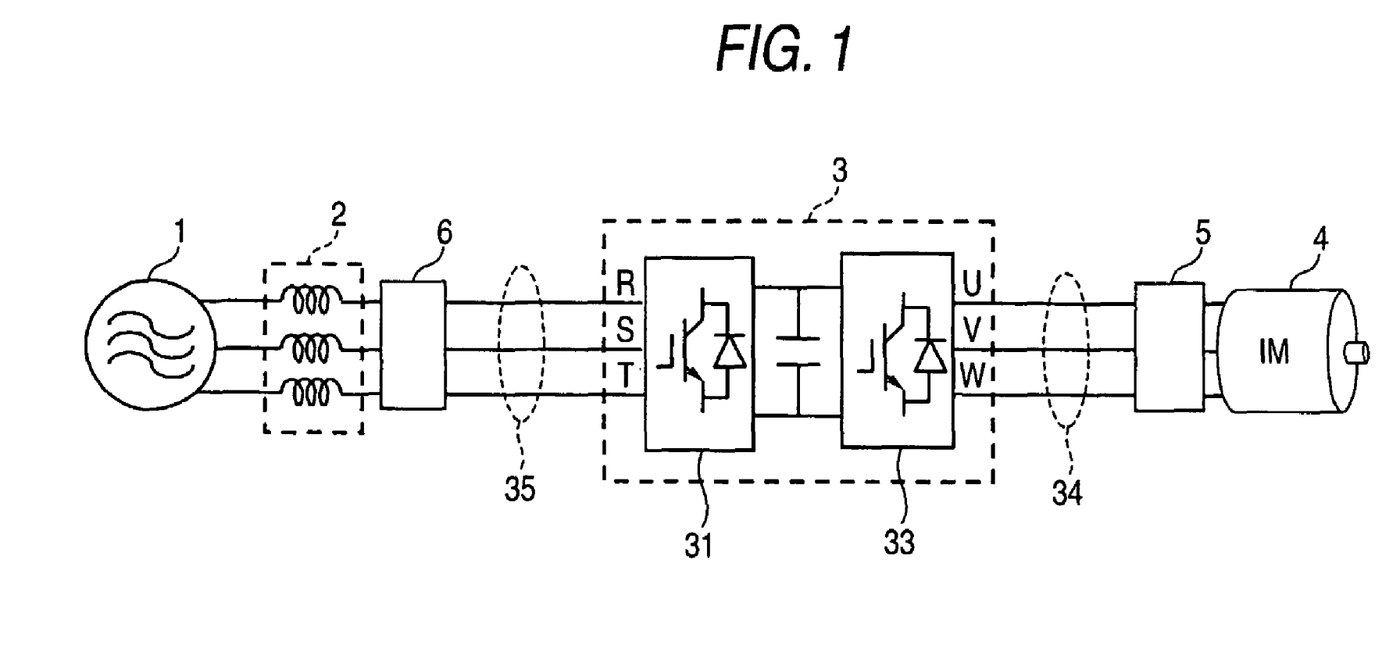
FIG. 1 shows the schematic configuration of a system equivalent to an embodiment of the invention.

Referring to the drawings, embodiments of the invention will be described below. FIG. 1 shows a motor driving system using a power converter controlled by switching, and an AC power supply 1, an AC reactor 2, the power converter 3 and a motor 4 are the same as those in the system shown in FIG. 11. The motor driving system according to the invention is different from the system shown in FIG. 11 in that a microsurge suppressor 5 is inserted on a power supply line from the power converter 3 to the motor 4 and the similar microsurge suppressor 6 is inserted on a power supply line from the AC reactor 2 to the power converter 3. However, the microsurge suppressor 6 is not essential and can be omitted. As shown in FIGS. 12 and 13, as surge voltage at the terminal of the AC reactor 2 is smaller than surge voltage at the terminal of the motor 4 and further, the length of a cable can be also shortened, the microsurge suppressor 6 may be also omitted depending upon the magnitude of the surge voltage.

The microsurge suppressors 5, 6 are provided with a multi-layer printed wiring board having two terminals connected to the power converter 3 and the motor 4 or the AC reactor 2 and a capacitor for bypassing a surge, and the terminal on the side of the motor 4 or on the side of the AC reactor 2 of the multi-layer printed wiring board is directly connected to the terminal of the motor 4 or the AC reactor 2. The multi-layer printed wiring board is provided with at least two wiring layers and wiring formed on the first and second wiring layers is capacitively coupled. The capacitor for bypassing a surge is connected between the terminal on the side of the motor 4 or on the side of the AC reactor 2 and the end on the side of a second terminal of the second wiring.

Figure 2:
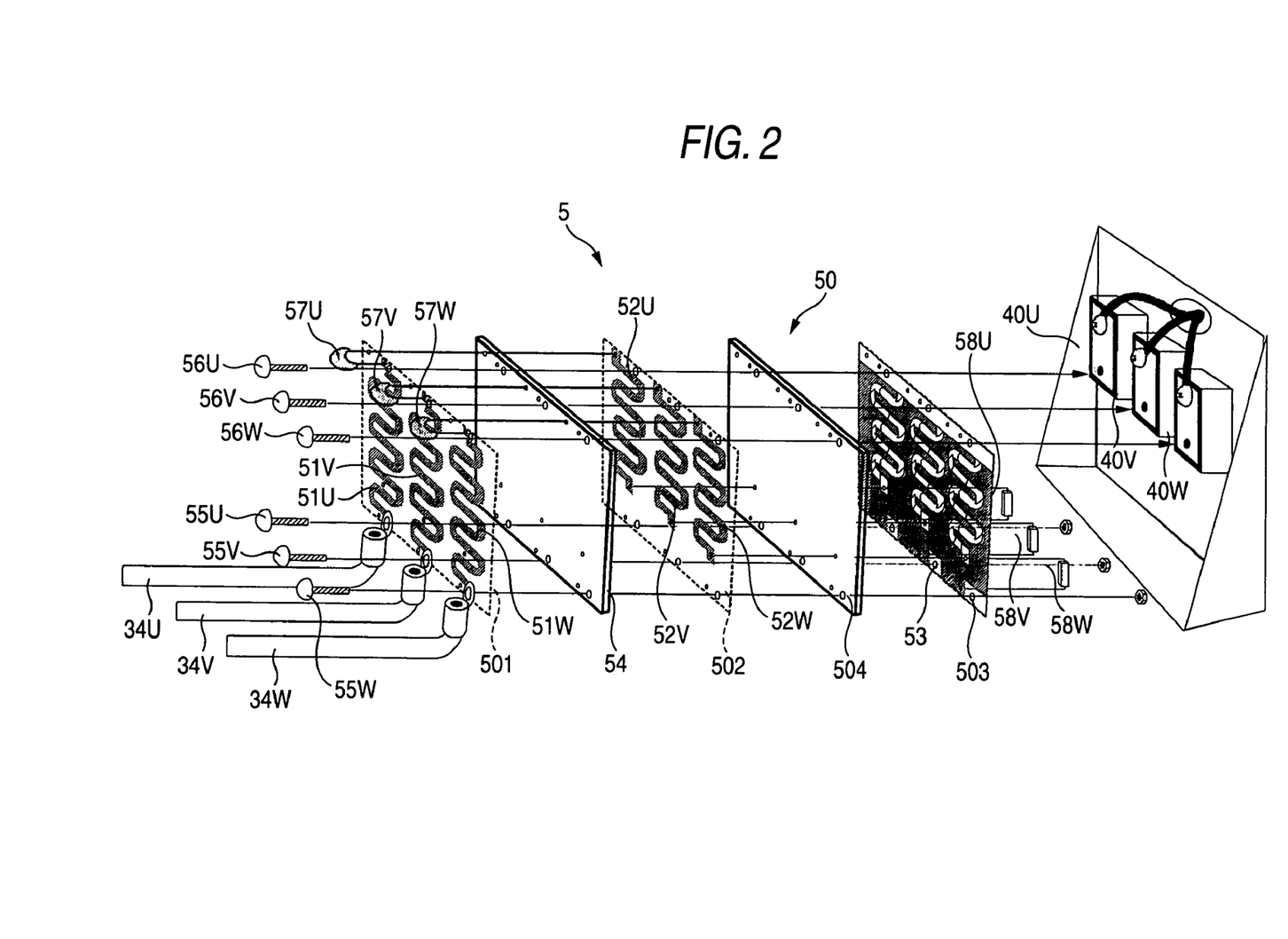
FIG. 2 shows the schematic configuration of a microsurge suppressor in the embodiment of the invention.

FIG. 2 shows the schematic configuration of the microsurge suppressor 5. The microsurge suppressor 5 shown in FIG. 2 includes a three-layer printed wiring board 50, the capacitors for bypassing a surge 57U, 57V, 57W (may be merely described as the capacitor for bypassing a surge 57) and damping resistors 58U, 58V, 58W (may be merely described as a damping resistor 58). The printed wiring board 50 is provided with a first wiring layer 501, a second wiring layer 502, a third wiring layer 503 and dielectric boards 54 arranged between the wiring layers 501 to 503. On the first wiring layer 501, first power wiring 51U, 51V, 51W for transmitting power (may be merely described as first power wiring 51) is formed, and at both ends of the first power wiring 51U, 51V, 51W, machine screws 55U, 55V, 55W forming a first terminal (may be merely described as the first terminal 55) and machine screws 56U, 56V, 56W forming a second terminal (may be merely described as the second terminal 56) are provided.

Besides, on the second wiring layer 502, second power wiring 52U, 52V, 52W for suppressing an oscillatory component by a reflected wave (may be merely described as second power wiring 52) is formed, and on the third wiring layer 503, third power wiring 53 to be a virtual grounding layer is formed. The first power wiring 51 and the second power wiring 52 are capacitively coupled by substantially equally patterning. The patterns of the first power wiring 51 and the second power wiring 52 are made symmetrical.

The first terminal 55 is connected to a cable 34 (34U, 34V, 34W) and the second terminal 56 is directly connected to the terminal 40 (40U, 40V, 40W) of the motor. The capacitor for bypassing a surge 57 is connected between the second terminal 56 and the end on the side of the second terminal of the second power wiring and the damping resistor 58 is connected between the other end (the end on the side of the first terminal) of the second power wiring and the third power wiring.

Figure 3:
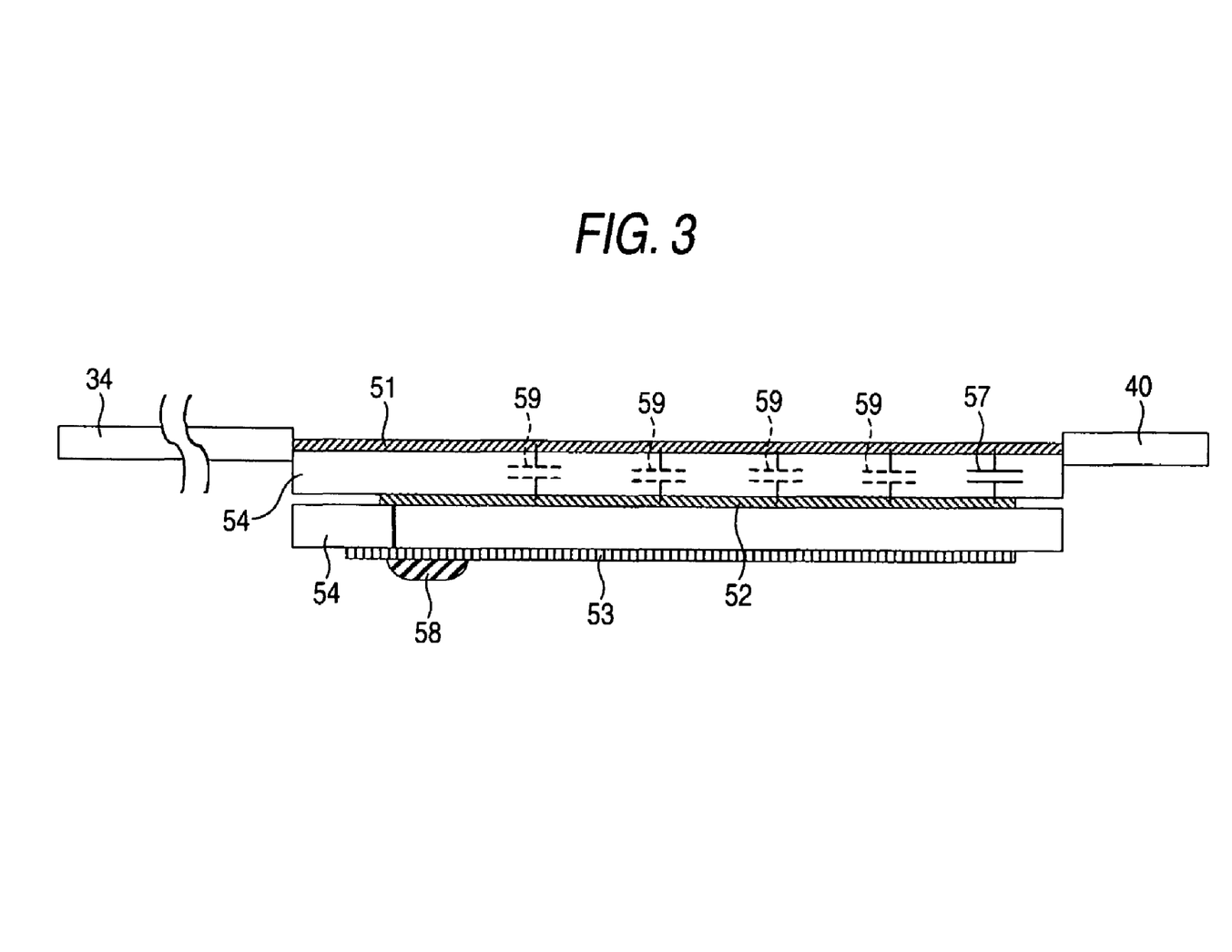
FIG. 3 shows the schematic section of the microsurge suppressor shown in FIG. 2.

FIG. 3 shows the schematic section of the microsurge suppressor 5 shown in FIG. 2. In FIG. 3, distributed capacitance 59 distributed to the first power wiring 51 and the second power wiring 52 is schematically shown by a broken line, however, the distributed capacitance 59 bypasses a high-frequency surge component propagated on the first power wiring 51 to the second power wiring 52 as described later. The high-frequency surge component that cannot be bypassed to the capacitor 59 is propagated to the second terminal 56 and is bypassed to the second power wiring 52 via the capacitor for bypassing a surge 57 connected to the second terminal 56. Therefore, the capacity of the capacitor for bypassing a surge 57 is set to a value larger than capacitance between the motor terminals 40.

As the high-frequency surge component propagated on the first power wiring 51 is bypassed to the second power wiring 52 via the distributed capacitance 59 and the capacitor for bypassing a surge 57 as described above, shaft current that flows to the side of the shaft of the motor 4 is suppressed.

Figure 4:
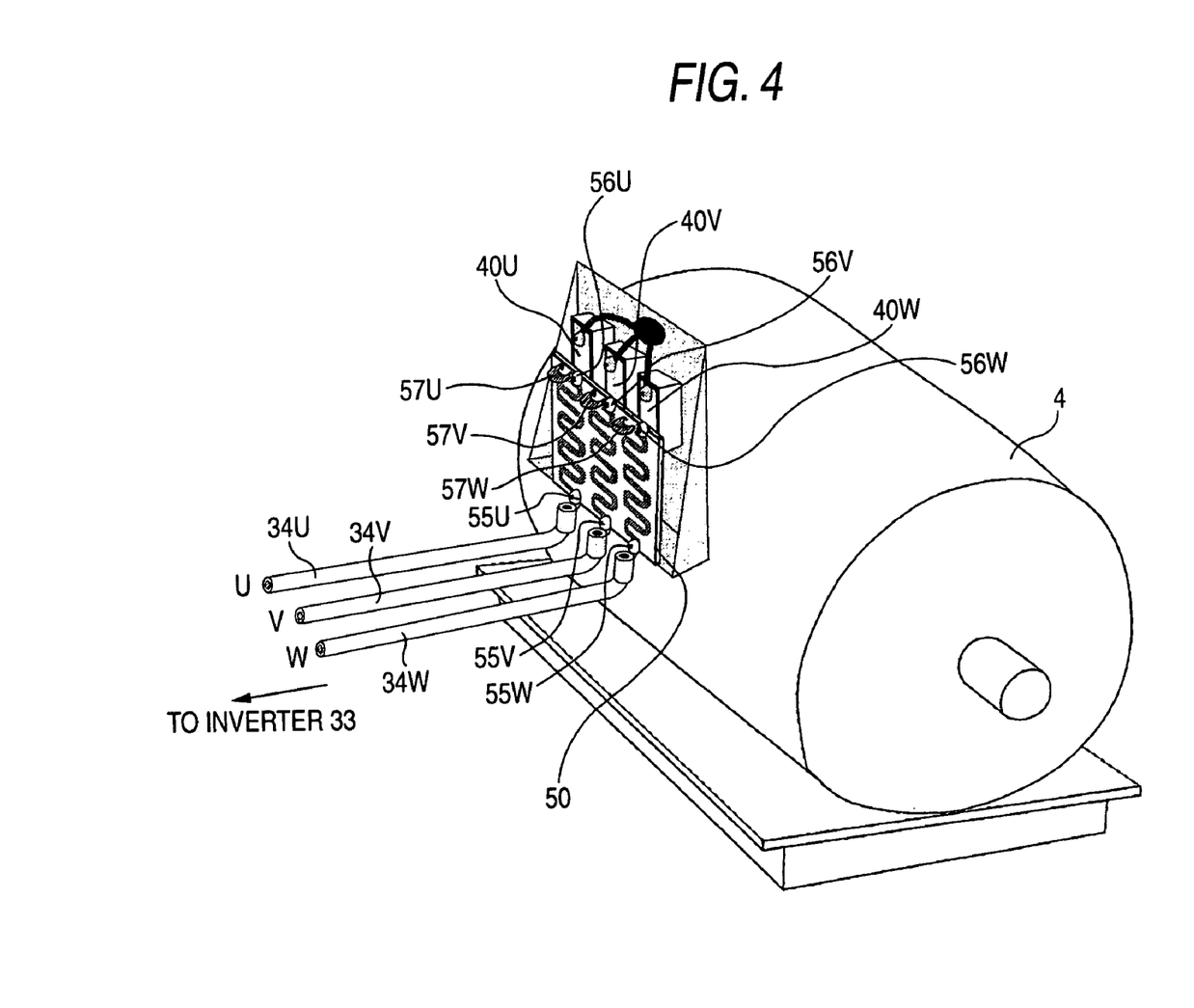
FIG. 4 shows a state in which the microsurge suppressor shown in FIG. 2 is attached to a motor.

FIG. 4 shows a state in which the microsurge suppressor 5 shown in FIG. 2 is attached to the motor 4. As clear from FIG. 4, the microsurge suppressor can be easily built in a terminal box of the motor 4.

Figure 5:
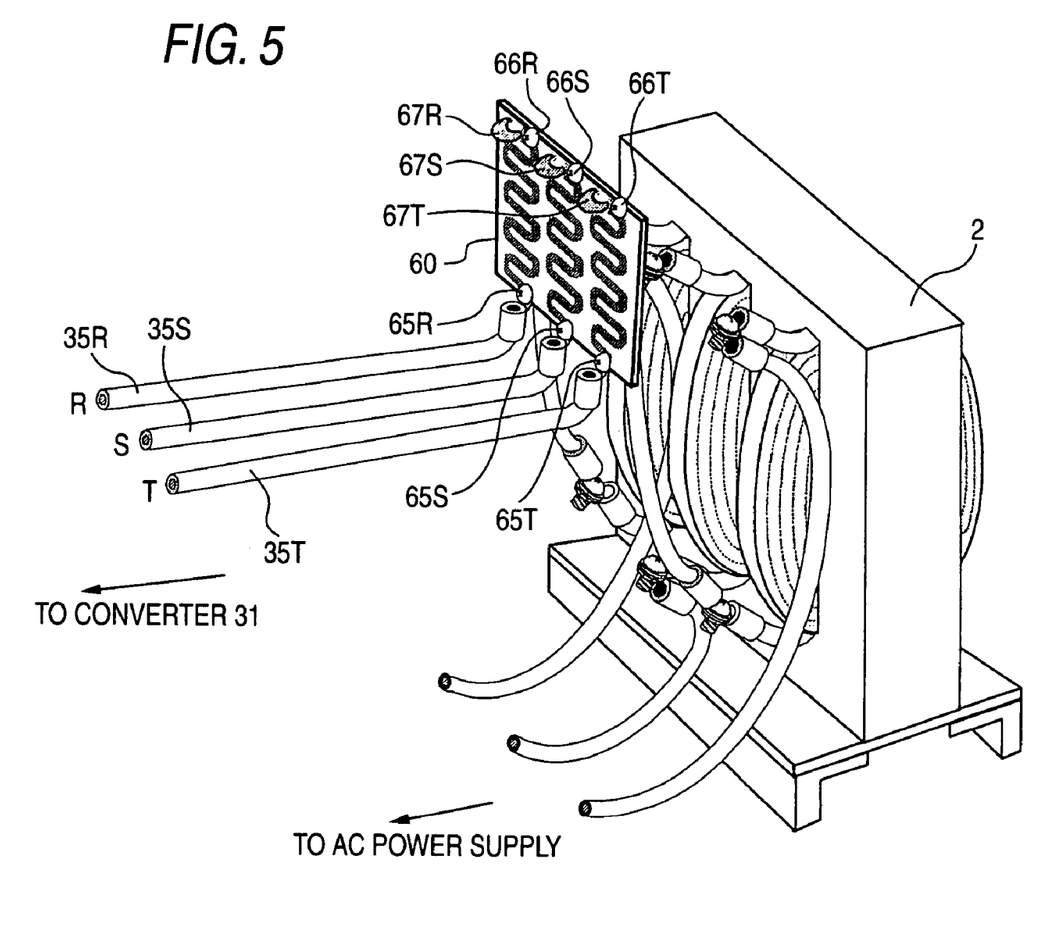
FIG. 5 shows a state in which the microsurge suppressor is attached to an AC reactor.

The microsurge suppressor 6 inserted on the power supply line from the AC reactor 2 to the power converter 3 is also provided with the similar configuration to that of the microsurge suppressor 5. FIG. 5 shows a state in which the microsurge suppressor 6 is attached to the AC reactor 2. The microsurge suppressor 6 includes a three-layer printed wiring board 60, a capacitor for bypassing a surge 67 (67R, 67S, 67T) and a damping resistor (not shown). The printed wiring board 60 is provided with the similar configuration to that of the printed wiring board 50 of the microsurge suppressor 5, a third terminal 65 (65R, 65S, 65T) is connected to a cable 35 (35R, 35S, 35T), and a fourth terminal 66 (66R, 66S, 66T) is directly connected to a terminal (not shown) of the AC reactor 2.

Figure 6:
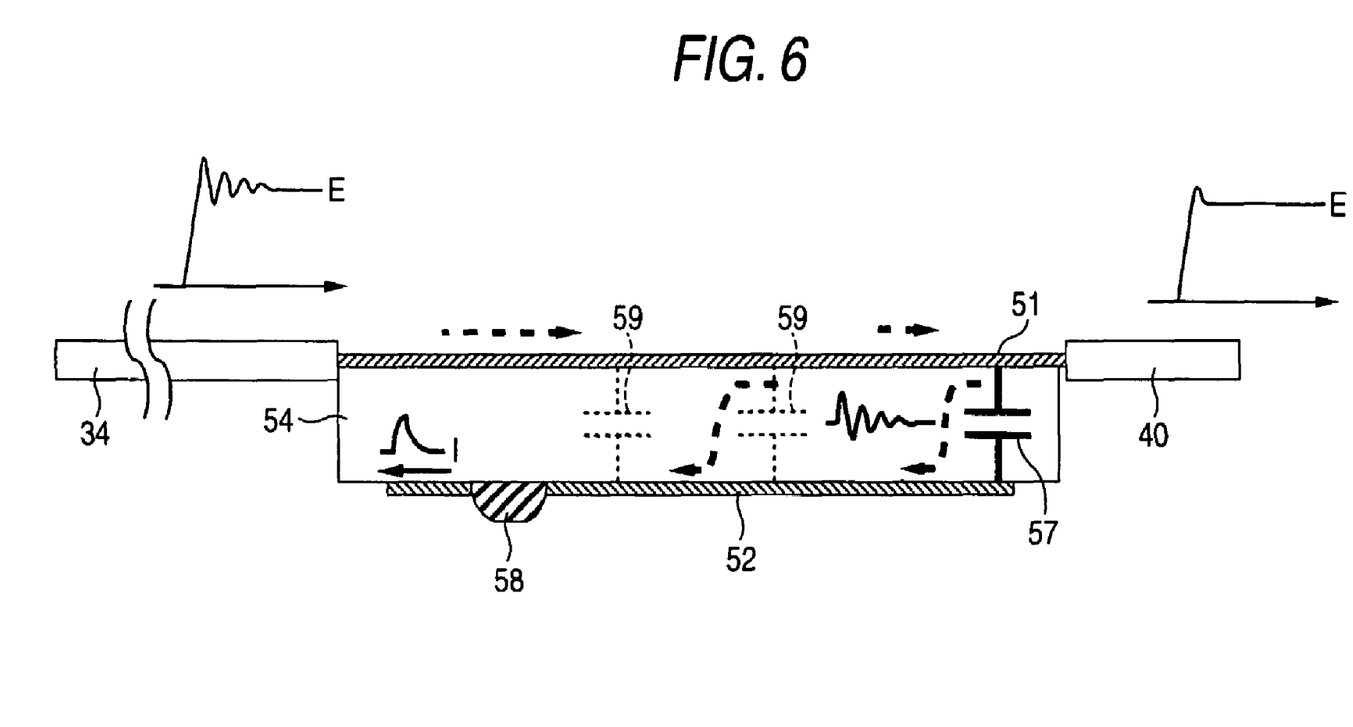
FIG. 6 shows the schematic section of another example of the microsurge suppressor.

In the above description, the printed boards 50, 60 forming the microsurge suppressors 5, 6 are respectively a three-layer board, however, they may be also respectively a two-layer board in which the third wiring layer is omitted. FIG. 6 shows the schematic section of another example of the microsurge suppressor 5. FIG. 6 is different from FIGS. 2 and 3 in that the third wiring layer 503 and the dielectric board 54 between the second wiring layer 502 and the third wiring layer 503 are omitted and a damping resistor 58 is provided to the second wiring layer 502.

Next, referring to FIG. 6, microsurge suppression operation will be described. In case direct current E is caused at the terminal of an inverter by the switching of the inverter 33, a voltage wave is propagated to the terminal of the motor via the cable 34 together with a current wave. When the voltage wave and the current wave reach the terminal 40 of the motor, they are reflected on the terminal 40 of the motor and advance toward the terminal of the inverter because the impedance of the cable and the motor is not matched. In case no measure is particularly taken, they are repeatedly reflected between the terminal of the inverter and the terminal 40 of the motor, being attenuated because of loss on the cable.

When the microsurge suppressor 5 shown in FIG. 6 is directly connected to the terminal 40 of the motor, voltage E including an oscillatory component by the mismatch of impedance at the first terminal 55 is propagated toward the terminal 40 of the motor on the first power wiring 51. As the first power wiring 51 and the second power wiring 52 of the printed wiring board 50 are capacitively coupled, a high-frequency component of the voltage E is attenuated as it is propagated toward the terminal 40 of the motor because distributed capacitance 59 flows on the second power wiring 52. The high-frequency component that is not attenuated flows on the second power wiring 52 via the capacitor for bypassing a surge 57. As a surge component by reflection at the terminal 40 of the motor similarly flows on the second power wiring 52 via the capacitor for bypassing a surge 57 and distributed capacitance 59, the repeat of reflection is suppressed and the generation of surge voltage at the terminal 40 of the motor is suppressed. A microsurge at the terminal 40 of the motor can be suppressed by generating the microsurge not at the terminal 40 of the motor but at the first terminal 55 of the microsurge suppressor 5 and controlling the generated microsurge by the distributed capacitance 59 between the first terminal 55 and the second terminal 56 and the capacitor for bypassing a surge 57 as described above.

The damping resistor 58 is provided to suppress a reflected wave induced onto the second power wiring 52, however, in case a reflected wave can be suppressed by the resistance of the second power wiring 52, the damping resistor may be also omitted. The capacitive coupling of the printed wiring board 50 and the damping resistor 58 will be supplemented below. The capacitive coupling of the first power wiring 51 and the second power wiring 52 is approximately 1.4 nF. As the capacitive coupling is not large as described above, only current of 1 A momentarily flows in the damping resistor 58 and the damping resistor of approximately 10 W fully plays a role. Therefore, the printed wiring board 50 can be miniaturized to an extent that it can be housed in the terminal box of the motor 4.

When the printed wiring board 50 includes three layers and the damping resistor is connected to the third power wiring 53 to be a floating virtual grounding layer as shown in FIGS. 2 and 3, an unbalanced component of each phase output from the inverter can be absorbed, the variation of potential is suppressed and a leak can be effectively prevented.

Next, it will be described that the microsurge suppressor 5 has effect to reduce electromagnetic noise. As current flows being attenuated in two ways by reflection at the terminal 40 of the motor and at the terminal of the inverter, that is, high-frequency current flows on the cable 34 in case no microsurge is suppressed, high-frequency noise is radiated from the cable 34. In the meantime, when the microsurge suppressor 5 is inserted, current reflected at the terminal 40 of the motor flows onto the second power wiring 52 and is suppressed, and therefore, bidirectional current flows only when the current is first reflected at the terminal 40 of the motor. Therefore, the radiation of high-frequency noise is greatly suppressed.

Further, as in the microsurge suppressor 5, current distribution concentrates on only the first wiring layer 501 and the inside of the second wiring layer and current flows mutually in reverse directions, a magnetic field on the surface of the board is negated. Therefore, noise radiated by current first reflected at the terminal 40 of the motor can be also suppressed. Suppression effect is further enhanced by making the first power wiring 51 and the second power wiring 52 symmetrical.

Next, an example in which a microsurge, motor shaft current and radiation noise are measured will be described.

Figure 7A:
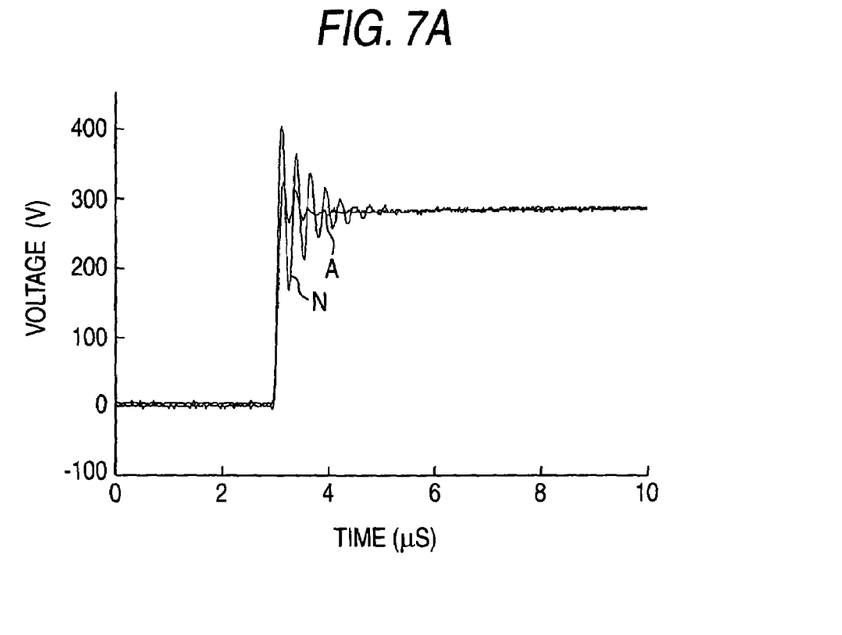
FIGS. 7A and 7B are explanatory drawings for explaining microsurge suppression effect on the side of the motor by the microsurge suppressor according to the invention.
Figure 7B:
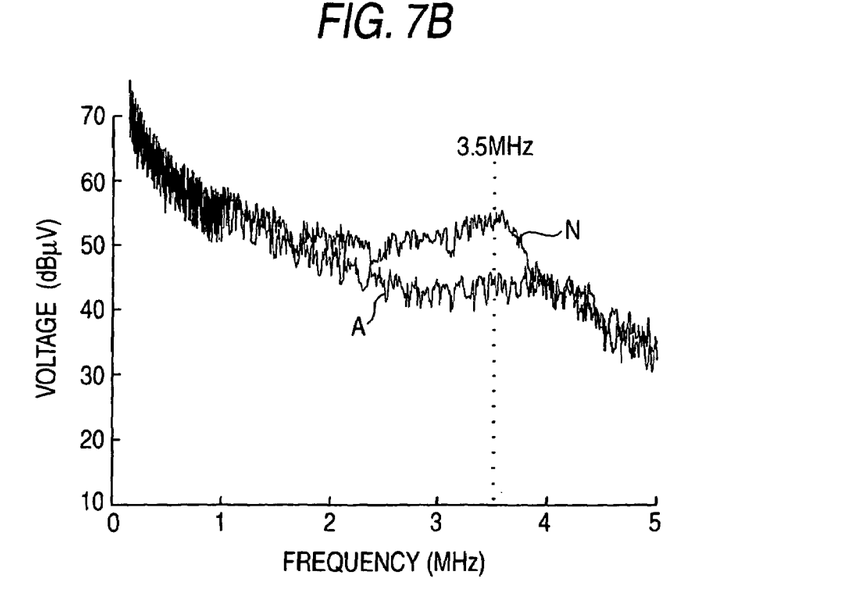

FIGS. 7A and 7B show the example of the measurement of a microsurge at the terminal 40 of the motor. FIG. 7A shows the hourly variation of motor terminal voltage and FIG. 7B shows its frequency spectrum. "A" in FIGS. 7A and 7B denotes the result of measurement when the microsurge suppressor 5 is used and "N" denotes the result of measurement when no microsurge suppressor 5 is used ("A" and "N" show the similar result of measurement in FIGS. 8 and 9). As clear from FIGS. 7A and 7B, when the microsurge suppressor 5 is used, a high-frequency oscillatory component is suppressed.

Figure 8A:
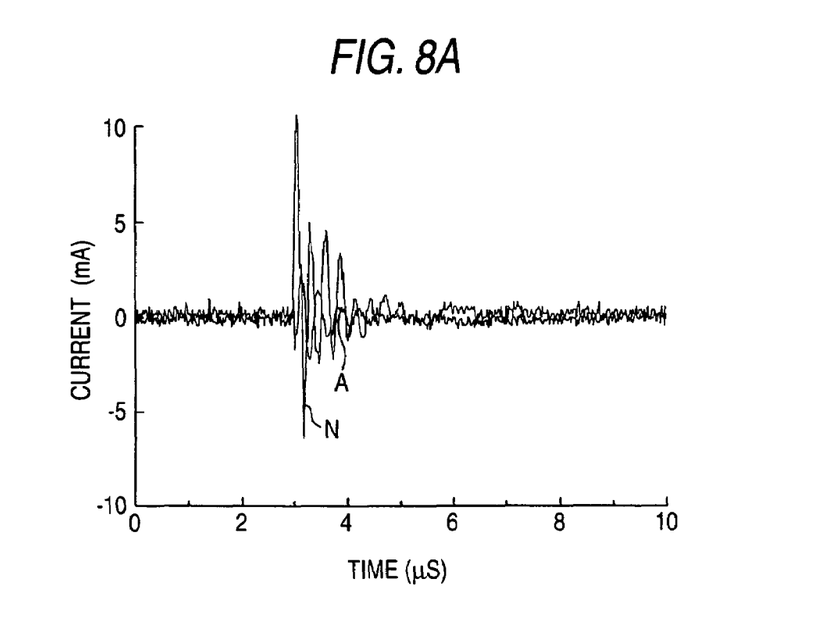
FIGS. 8A and 8B are explanatory drawings for explaining the suppression effect of motor shaft current by the microsurge suppressor according to the invention.
Figure 8B:
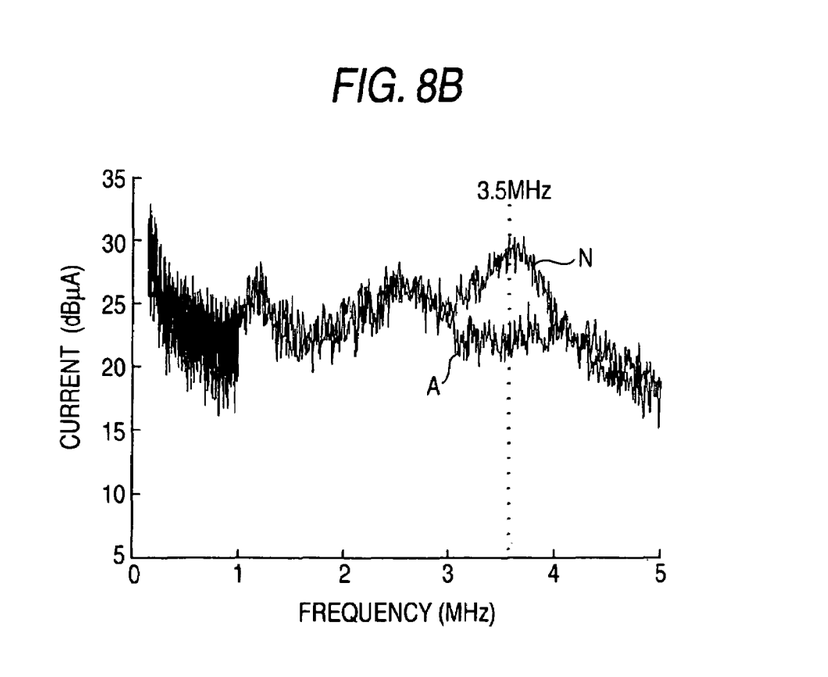

FIGS. 8A and 8B show an example of the measurement of motor shaft current. FIG. 8A shows the hourly variation of motor shaft current and FIG. 8B shows its frequency spectrum. When motor shaft current is measured, a motor in which a motor frame and a bearing frame are insulated is used and the measurement is made by short-circuiting these two frames. As current (shaft current) that flows in a short-circuited location flows through a path of the shaft—a bearing—the motor frame, shaft current is measured. FIGS. 8A and 8B show that as the peak value of voltage at a leading edge is suppressed by suppressing the peak value of a microsurge, shaft current is also suppressed.

Figure 9:
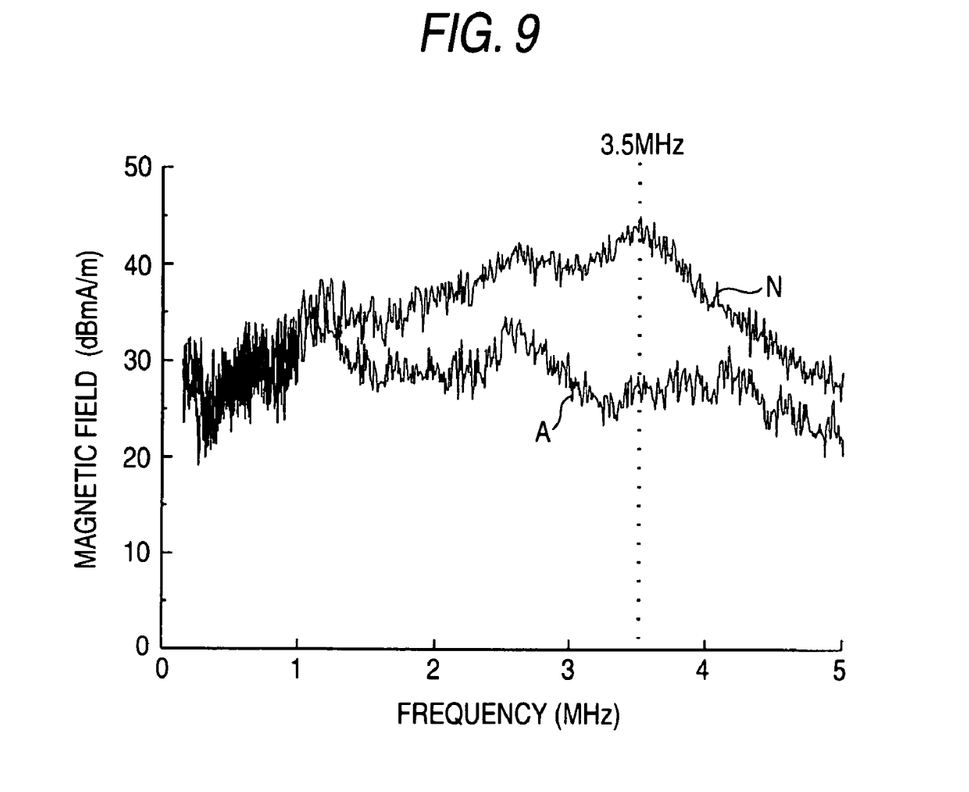
FIG. 9 is an explanatory drawing for explaining the suppression effect of radiation noise at the terminal of the motor by the microsurge suppressor according to the invention.

FIG. 9 shows an example of the measurement of a magnetic field showing radiation noise in the vicinity of the terminal of the motor. FIG. 9 shows its frequency spectrum and radiation noise is clearly suppressed by the microsurge suppressor 5.

Figure 10A:
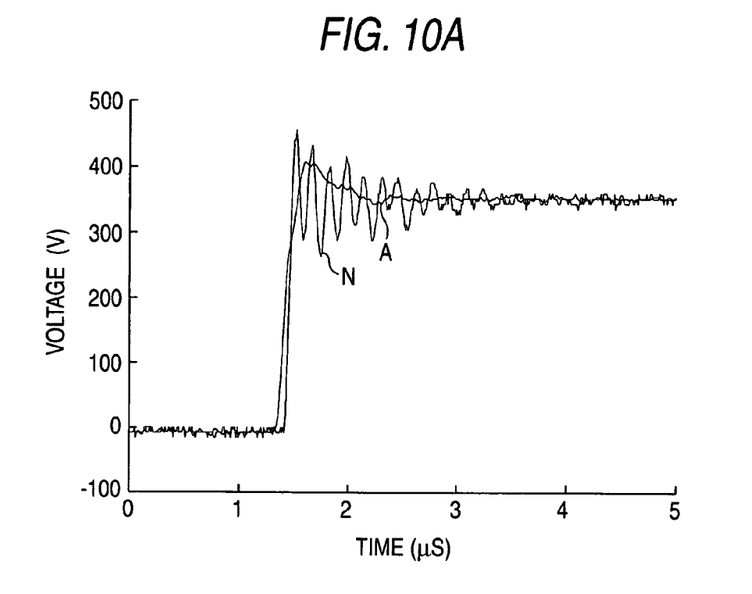
FIGS. 10A and 10B are explanatory drawings for explaining microsurge suppression effect on the side of the AC reactor by the microsurge suppressor according to the invention.
Figure 10B:
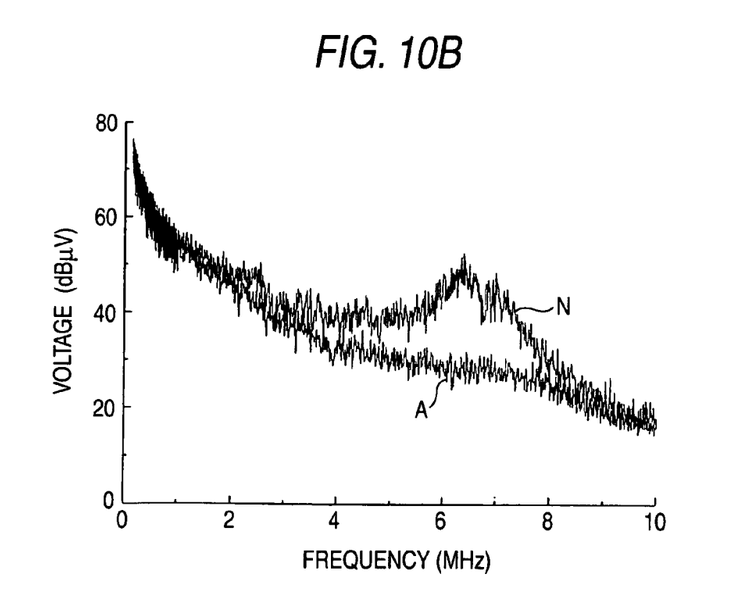

FIGS. 10A and 10B show an example of the measurement of a microsurge at the terminal on the side of the power converter of the AC reactor. FIG. 10A shows the hourly variation of terminal voltage and FIG. 10B shows its frequency spectrum. "A" in FIGS. 10A and 10B shows the result of measurement when the microsurge suppressor 6 is used and "N" shows the result of measurement when no microsurge suppressor 6 is used. As clear from FIGS. 10A and 10B, when the microsurge suppressor 6 is used, a high-frequency oscillatory component is suppressed.

What is claimed is:

1. A system, comprising:
   a power converter controlled by switching, and
   a microsurge suppressor on the side of a load inserted on a power supply line from the power converter to the load, wherein
   the microsurge suppressor on the side of the load includes a multi-layer printed wiring board on the side of the load provided with a first terminal on the side of the power converter and a second terminal on the side of the load, and a capacitative element for bypassing a surge on the side of the load;
   a first power wiring and a second power wiring respectively capacitively coupled are formed on a first wiring layer and a second wiring layer of the multi-layer printed wiring board on the side of the load;
   the first terminal and the second terminal are connected via the first power wiring;
   the second terminal and a terminal of the load are directly connected; and
   the capacitative element for bypassing a surge on the side of the load is directly connected to the second terminal and the end on the side of the second terminal of the second power wiring.

2. The system according to claim 1, wherein the capacity of the capacitative element for bypassing a surge on the side of the load is larger than capacitance between the terminals of the load.

3. The system according to claim 1, wherein the first power wiring and the second power wiring are geometrically symmetrical.

4. The system according to claim 1, further comprising: a damping resistor connected to the end on the side of the first terminal of the second power wiring.

5. The system according to claim 1, wherein the multi-layer printed wiring board includes a third power wiring to be a virtual grounding conductor formed on a third layer; and
   a damping resistor connected between the end on the side of the first terminal of the second power wiring and the third power wiring is provided.

6. The system according to claim 1, further comprising: a microsurge suppressor on the input side inserted on a power supply line from an AC reactor on the side of an AC power supply to the power converter, wherein
   the microsurge suppressor on the input side includes a multi-layer printed wiring board on the input side provided with a third terminal and a fourth terminal, and a capacitative element for bypassing a surge on the input side;
   a fourth power wiring and a fifth power wiring respectively capacitively coupled are formed on a first wiring layer and a second wiring layer of the multi-layer printed wiring board on the input side;
   the third terminal and the fourth terminal are connected via the fourth power wiring;
   the fourth terminal and a terminal of the AC reactor are directly connected; and
   the capacitative element for bypassing a surge on the input side is directly connected to the fourth terminal and the end on the side of the fourth terminal of the fifth power wiring.

7. The system according to claim 1, wherein the capacity of the capacitative element for bypassing a surge on the input side is larger than capacitance between the terminals of the AC reactor.

8. The system according to claim 1, wherein the fourth power wiring and the fifth power wiring are geometrically symmetrical.

9. The system according to claim 1, further comprising; a damping resistor connected to the end on the side of the third terminal of the fifth power wiring.

10. The system according to claim 1, wherein the multi-layer printed wiring board includes a sixth power wiring to be a virtual grounding conductor formed on a third layer; and
    a damping resistor connected between the end on the side of the third terminal of the fifth power wiring and the sixth power wiring is provided.

11. A microsurge suppressor that suppresses the generation of a microsurge in a system using a power converter controlled by switching, comprising:
- a multi-layer printed wiring board provided with a first terminal on the side of the power converter and a second terminal on the side of another equipment; and
- a capacitative element for bypassing a surge, wherein
- a first power wiring and a second power wiring respectively capacitively coupled are formed on a first wiring layer and a second wiring layer of the multi-layer printed wiring board;
- the first terminal and the second terminal are connected via the first power wiring;
- the second terminal and a terminal of the other equipment are directly connected; and
- the capacitative element for bypassing a surge is directly connected to the second terminal and the end on the side of the second terminal of the second power wiring.

12. The microsurge suppressor according to claim 11, wherein
the capacity of the capacitative element for bypassing a surge is larger than capacitance between the terminals of the other equipment.

13. The microsurge suppressor according to claim 11, wherein
the first power wiring and the second power wiring are geometrically symmetrical.

14. The microsurge suppressor according to claim 11, further comprising:
a damping resistor connected to the end on the side of the first terminal of the second power wiring.

15. The microsurge suppressor according to claim 11, wherein
the multi-layer printed wiring board includes a third power wiring to be a virtual grounding conductor formed on a third layer; and
a damping resistor connected between the end on the side of the first terminal of the second power wiring and the third power wiring is provided.

16. The microsurge suppressor according to claim 11, wherein
the other equipment is a load driven by the power converter.

17. The microsurge suppressor according to claim 11, wherein
the other equipment is an AC reactor connected to the side of an AC power supply for supplying to the power converter.

* * * * *